Jan. 25, 1949.    V. WEBER    2,459,906
AUTOMATIC REVERSING CONTROL FOR ELECTRIC MOTORS
Original Filed Aug. 6, 1943
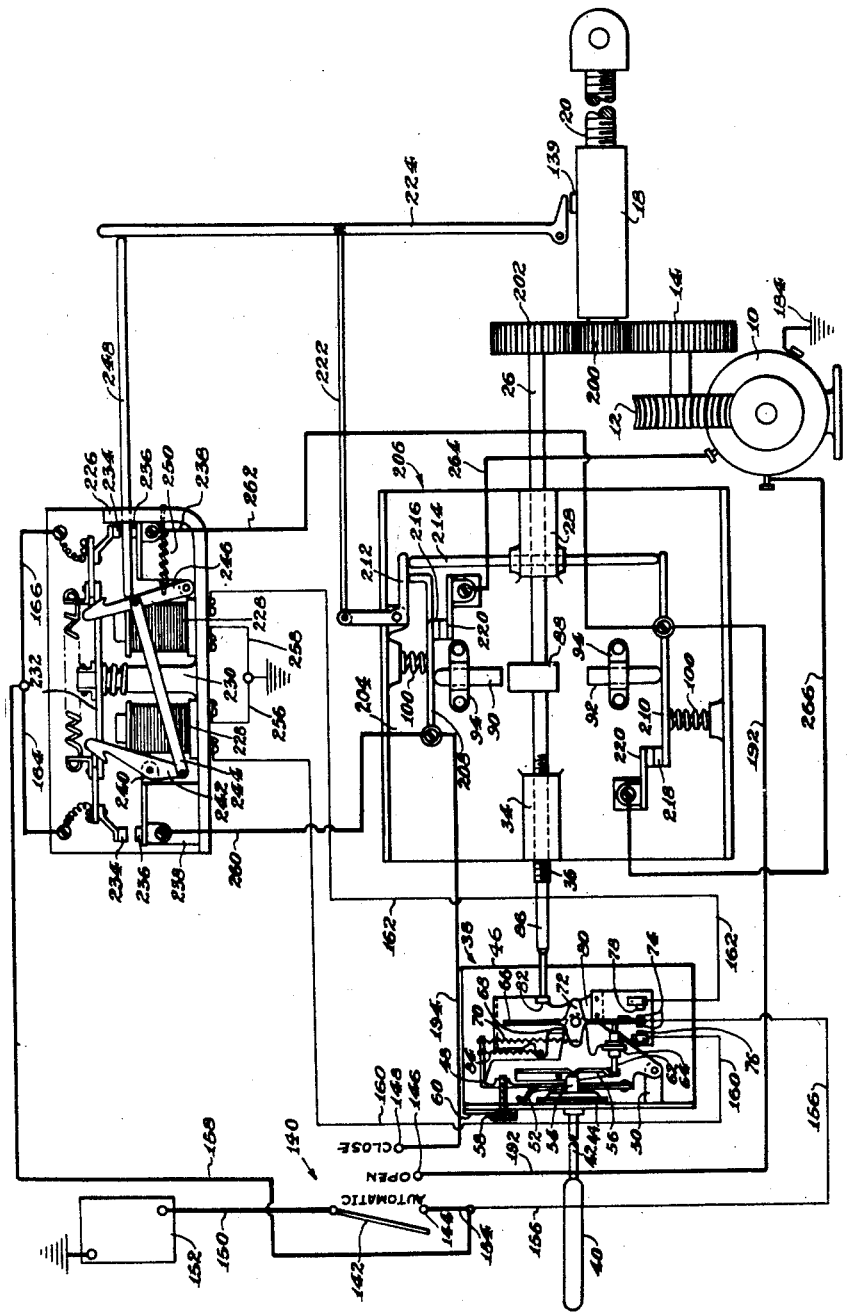
INVENTOR.
VICTOR WEBER.
BY Albert J. Henderson
his ATTORNEY.

Patented Jan. 25, 1949

2,459,906

UNITED STATES PATENT OFFICE 2,459,906

AUTOMATIC REVERSING CONTROL FOR ELECTRIC MOTORS

Victor Weber, Greensburg, Pa., assignor to Robertshaw-Fulton Controls Company, a corporation of Delaware Original application August 6, 1943, Serial No. 497,613. Divided and this application June 7, 1947, Serial No. 753,276

3 Claims. (Cl. 318—265)

This invention relates to temperature controlling systems and, more particularly, to thermostatic controls for shutter or cowl flap actuating mechanisms which regulate the temperature of the cooling systems of motor driven vehicles, such as aircraft and the like. This application is a division of my copending application Serial No. 497,613 filed August 6, 1943.

The system includes a reversible electric motor having a relay in the motor circuit which has its armature latched against fluttering. Where position limit switches are utilized to control the motor circuit it is necessary to release the latch when these limit switches operate in order that a reverse operation of the motor may occur. The present invention includes a mechanical type of latch with provision for interconnecting the limit switch mechanism therewith for the stated object.

Other objects and advantages will become apparent from the following description taken in connection with the accompanying drawing, which is a schematic view of the temperature controlling device in conjunction with a wiring diagram of the electrical circuit used therewith.

Referring more particularly to the drawing, a reversible motor 10 is provided for operating a shaft 18 of the shutter mechanism (not shown) through a worm gear 12 and reduction gears 14 and 200, the latter gear being shown as integral with the shaft 18. The rotation of the shaft 18 causes reciprocation of a jack screw 20 to which the shutter mechanism is attached and which is thereby opened or closed to regulate the temperature of the cooling system. The gear 200 drives a gear 202 attached to a travelling spindle 26 which revolves at a much slower speed than the shaft 18, as will be hereinafter apparent. The travelling spindle 28 is journalled in a bearing 28 carried on a support 204 for mechanism to be described hereinafter. The travelling spindle 26 is provided with a threaded portion 36 which engages with a threaded bearing 34 carried on the support 204 in alignment with the bearing 28.

Positioned in operative relation with the travelling spindle 26 is a thermostatic control device designated generally by the reference numeral 38 and forming the subject-matter of my copending application Serial No. 646,628, filed February 9, 1946. The thermal unit of this mechanism comprises a bulb 40, capillary tubing 42 and expansible diaphragm 44 constituting a fluid-type actuator. The diaphragm 44 is supported in a frame 46 which houses the thermostatic control mechanism. The bulb 40 which is located exterior of the frame 46 is adapted for immersion in the cooling liquid which circulates through the radiator of the vehicle. Hence, the device operates by changes in temperature at the bulb 40 causing expansion or contraction of the fluid therein and corresponding expansive or contractive movement of the diaphragm 44.

A sub-frame 48 of channel form in cross section is pivotally mounted at one end on lugs 59 projecting inwardly of frame 46 and is urged away from the adjacent wall of the frame 46 by a leaf spring 52 which is secured at one end to the sub-frame 48 and has its free end engaging the wall of the main frame 46. The leaf spring 52 and sub-frame 48 are suitably apertured to permit a button 54 carried by the diaphragm 44 to pass freely therethrough into engagement with a thermostat lever 56. To counteract the bias of the spring 52 on the sub-frame 48 a calibrating screw 58 may threadedly engage the frame 48 at the end opposite the pivotal mounting thereof and extend through the wall of the frame 46 for convenient access from the exterior. An indicator plate 60 is carried on the frame 46 in operative engagement with the calibrating screw 58 to indicate the extent of adjustment of the frame 48.

The thermostat lever 56 is pivotally mounted between the side walls of the channel-shaped sub-frame 48 and is engaged on one side of its pivotal mounting by the button 54 of the thermal unit. Preferably, the pivotal mounting of the thermostat lever 56 is located on the axis thereof and the lever 56 is thus supported in substantial balance or equilibrium on either side of its pivotal mounting. The button 54 which engages the lever 56 is offset from the pivot and this engaged side of the lever 56 also engages a pin 62 on the opposite surface to that engaged by the button 54. The pin 62 is mounted in a suitable bearing 64 formed inwardly of one side wall of the sub-frame 48 for reciprocation in a direction parallel with the axis of the diaphragm button 54. The opposite end of the pin 62 engages with a switch blade 66 which is pivotally mounted on oppositely disposed ears 68 projecting from the side walls of the channel-section frame 48. As in the case of the thermostat lever 56, the switch blade 66 is pivotally mounted on its axis for obtaining substantial balance therein.

A coil spring 70 is operative between an end wall of the sub-frame 48 and one end of a lug 72 formed on the switch blade 66 on either side of the pivotal mounting. Preferably, the lug 72 is symmetrical about the pivotal mounting of the switch blade 66 in order to maintain the switch blade 66 in substantial balance as described. The coil spring 70 serves to bias the switch blade 66 toward the pin 62 whereas expansive movement of the diaphragm 44 communicated through the button 54 to the thermostat lever 56 will serve to oppose this bias. The end of the switch blade 66, beyond the portion engaged by the pin 62, is insulated from the other portion and carries contacts 74 disposed on opposite faces thereof and adapted for engagement alternatively, upon pendulum movement of the blade, with contacts 76 and 78 carried on a contact arm 80 and suitably insulated therefrom.

The contact arm 80 is interposed between the switch blade 66 and the ear 68 on one side of the frame 48 and may be pivoted on the latter in common with the switch blade 66. An abutment 82 is formed on the contact arm 80 on the side of its pivotal mounting opposite the contacts 76, 78. The contact arm 80 is biased for clockwise movement as viewed in Fig. 1 by a coil spring 84 operative between the sub-frame 48 and an anchorage on the contact arm 80 on the same side of the pivotal mounting as the abutment 82. As in the case of the thermostat lever 56 and the switch blade 66, the contact arm 80 is preferably pivotally mounted on its axis for obtaining substantial balance therein.

The abutment 82 on the contact arm 80 is adapted to be engaged by a projecting portion 86 of the travelling spindle 26 and is urged into such relation by means of the coil spring 84. Upon rotation of the gear 202 from the motor 10 through the gearing described, the travelling spindle 26 will revolve and, due to the threaded engagement of the portion 36 thereon with the threaded bearing 34, will reciprocate transversely of the shaft 18 causing pivotal movement of the contact arm 80 and consequent movement of the contacts 76—78 thereon with respect to the switch blade contacts 74.

As previously indicated, in addition to the structure for operating the shutter mechanism automatically according to the temperature of the cooling liquid as sensed by the thermostat bulb 40, this invention contemplates independent means for limiting movement of the shutter mechanism to prevent damage thereto should the thermostat mechanism overrun. It will be apparent that such independent means need only operate at the extremes of opening and closing movements of the shutter mechanism and that at intermediate positions the thermostat operation can safely be permitted to control.

To this end, a limit switch mechanism 206 is mounted on the support 204 and the spindle 26 is provided intermediate the bearings 28 and 34 with a cam element 88 which may be formed integral with the spindle 26. The cam 88 is adapted to engage alternately with oppositely disposed pins 90, 92 reciprocably mounted in bearings 94 carried by the support 204. The ends of the pins 90, 92 opposite the portion engageable by the cam 88 are adapted to engage with opposed switch arms 208, 210 of the limit switch mechanism. The switch arm 208 is pivoted at one end on the support 204 and the opposite end thereof is upturned to engage with a bell-crank lever 212. The bell-crank lever 212 is pivotally mounted on the support 204 and has the end which engages the upturned end of the switch arm 208 also engaging a pin 214 reciprocably mounted in the bearing 28 transversely of the travelling spindle 26. The opposite end of the pin 214 projecting from the bearing 28 engages with one end of the contact arm 210 which is pivotally mounted intermediate its ends on the support 204. Both contact arms 208 and 210 are biased into engagement with the pins 90 and 92 by springs 100.

The switch arm 208 carries a contact 216 between the upturned end and the portion engaged by the pin 90. Contact arm 210 carries a contact 218 on the end opposite the portion engaged by the pin 214. Contacts 216 and 218 are normally engaged with fixed contacts 220 mounted on the support 204 and are adapted to be disengaged therefrom by operation of the pins 90 and 92 by the cam 88. The opposite end of the bell-crank lever 212 carries a lever arm 222 pivotally mounted thereon and similarly mounted at its opposite end on an operating lever 224. The operating lever 224 may also be formed as a bell-crank having its opposite end positioned to be engaged by actuating means in the form of a cam 139 carried by the shaft 18.

The motor circuit includes a relay similar to that disclosed and claimed in my copending application Serial No. 489,180 filed May 31, 1943. Accordingly, a base 226 carries a pair of relay coils 228 spaced one from the other and having a support 230 projecting therebetween. Pivotally mounted on the support 230 is an armature 232 carrying contacts 234 on each end thereof. These contacts are adapted to be moved into and out of engagement with fixed contacts 236 which are mounted on insulating pads 238 on the base 226, such movement being caused by operation of the armature 232 into either of its attracted positions. One of the insulating pads 238 is provided with a lug 240 upon which a latching arm 242 is pivotally mounted intermediate its ends. The latching arm 242 extends into engaging relation with the armature 232 and is provided with a suitably shaped end for latching engagement therewith when the armature is in attracted position. The opposite end of the latching arm 242 carries a cross arm 244 which pivotally engages with a second latching arm 246 having a similarly shaped end for engagement with the opposite end of the armature when in its other attracted position. The latching arm 246 is engaged by an operating bar 248 reciprocally mounted on the base 226 and projecting therefrom into engagement with the operating lever 224. A coil spring 250 mounted between the latching arm 246 and the base 226 serves to bias the arm into engagement with the operating bar 248.

Positioned for convenient use by the vehicle operator is a main control switch designated generally by the numeral 140. This switch 140 has a switch arm 142 movable to three positions, one position 144 being an automatic control position wherein the thermostat 40—44 can function to cause opening and closing of the shutter. The remaining two positions 146 and 148 denote manual control positions, the former serving to effect opening and the latter closing of the shutter. Movement of the switch arm 142 to a neutral position as shown in the drawing serves as the "off" or circuit breaking position.

The circuit arrangement comprises a source of current 152, with a wire 150 leading from one terminal to a main control switch arm 142, the opposite terminal being grounded as shown. In the automatic position 144, the energizing circuit for the relay coils 228 may be traced by way of wires 154, 156 to the switch contacts 74 of the thermostat mechanism. The contacts 76, 78 of contact arm 80 with which contacts 74 cooperate are connected by wires 160, 162 to the pair of relay coils 228, respectively. The relay coils are grounded by the wires 256, 258, thus completing the relay coil circuit.

The motor circuit includes common wires 154, 158 and wires 164, 166 to the relay contacts 234 of the relay armature 232. Wires 260, 262 connect the fixed contacts 236 of the relay to contacts 216 and 218, respectively, of the limit switch mechanism 206. Contacts 220 of the limit switch 206, with which contacts 216, 218 thereof cooperate, are connected by wires 264, 266 to the motor windings. The motor is grounded by the wire 184 as shown in the drawing.

In the operation of the device, it is apparent that the shaft 18, which completes several revolutions for every revolution of the travelling spindle 26, will operate the relay latching device through the medium of the levers described. Thus, in the automatic position 144, assuming that the thermostatic switch mechanism 38 has operated through the circuit described and caused the relay armature 232 to be attracted, then the latching arm 242 or 246, as the case may be, will have moved into position to retain the armature 232 in such attracted position. As the cam 139 carried by shaft 18 moves into engagement with the bell-crank lever 224 upon every revolution of the shaft 18, the latching device will be released for an instant. If then the thermostatic switch mechanism 38 is in the open contact position and the circuit through the line relay coil 228 is deenergized, the relay armature 232 will return to its neutral position. If, however, the thermostatic switch mechanism 38 is in closed contact position, then the operation of the latching mechanism by the cam 139 will not affect the position of the armature 232 which remains attracted.

Since the limit switch mechanism 206 in this embodiment is controlling the motor circuit it is essential that the latching device for the relay be released whenever the limit switch mechanism 206 operates to open the motor circuit. In the absence of such provision it will be apparent that the relay armature 232 would remain locked in attracted position, although the shutter or cowl flap mechanism had reached the extreme of movement, either closed or open, and the motor 10 was deenergized. As the next movement of the shutter mechanism would have to be in the opposite direction by reversed motor operation, the relay armature 232 would necessarily have to reverse its position before the circuit for such operation of the motor could be established. Hence, provision is made in this invention for interconnecting the limit switch mechanism 206 with the latching device for the relay armature 232.

To this end, when the pin 90, for example, is operated by the cam 88 to open contacts 216, 220, then the upturned end of the contact arm 208 will cause the bell-crank lever 212 to pivot and move the lever 224 through the connecting lever 222. When the lever 224 is moved, as described, the effect is similar to movement of this lever by the cam 139 and the latching device is released. In a similar manner operation of the pin 92 by the cam 88 to open contacts 218, 220, will cause the end of the pivoted contact arm 210 to move the bell-crank lever 212 through the medium of the pin 214. This movement of the bell-crank lever 212 will cause the above described movement of the latching device as will be apparent. The armature 232 immediately returns to neutral position ready to be moved to attracted position.

The manual positions 146 and 148 are so connected with the motor 10 that the circuit includes only the limit switch mechanism 206. Accordingly, wire 192 connects position 146 with limit switch contacts 218, 220 and wire 266 completes the circuit from these contacts to the motor 10. In position 148, wire 194, switch contacts 216, 220 and wire 264 serve a similar purpose. Thus, there is no danger of feed-back through the system if the relay armature 232 becomes fixed in an attracted position.

It will be understood that various changes may be made in the arrangement and combination of parts and that the schematic embodiment is subject to various modifications in form without departing from the scope of the invention so that this description and accompanying drawing are intended by way of illustration only and are not to be construed in a limiting sense.

I claim:

1. In combination, a reversible electric motor, a control switch operable between controlling positions for selecting the direction of operation of said motor, a relay in the motor circuit having an armature initially movable between attracted and released positions upon operation of said switch to one controlling position, means for latching said relay armature in one of its said positions to maintain said circuit energized irrespective of subsequent operation of said control switch to another controlling position, means operated intermittently from said motor in either direction to release said latching means and permit said control switch to cause deenergization of said circuit, position limit switch means in said circuit, means operated from said motor in either direction for operating said limit switch means to deenergize said circuit independently of said control switch, and means operated by said limit switch means concomitantly therewith for releasing said latching means.

2. A control system for cowl flap or shutter actuators, comprising a reversible electric motor, a control switch for said motor movable to opposite "on" positions and having an intermediate "off" position, thermally responsive means for operating said switch to any one of said positions and selecting the direction of operation of said motor in said "on" positions, a rotatable shaft driven by said motor in opposite directions according to the position of said switch, an electromagnetic device for relaying current between said switch and motor, said device having an armature movable to opposite attracted positions upon operation of said switch corresponding to the selected direction of said shaft, latching means for maintaining said armature in either attracted position irrespective of subsequent movement of said switch to "off" position, said means being biased to latching position, means operated intermittently from said shaft in either direction thereof for overcoming said bias to release said latching means and cause deenergization of said motor when said switch is in "off" position, position limit switch means in the circuit from said relay to the motor, means operated from the shaft in either direction thereof for operating said limit switch means to deenergize said motor independently of said control switch, and means operated by said limit switch means concomitantly therewith for releasing said latching means whereby subsequent operation of the motor in reverse direction may be initiated by said control switch upon operation of said thermally responsive means.

3. Automatic reversing control for electric motors comprising a reversible electric motor, a control switch movable between open and closed positions, a relay including a coil and movable armature having contacts operable thereby, a relay circuit including said control switch and said coil for causing closure of said contacts in the closed position of said switch, a motor circuit controlled by said contacts for operation of said motor when said contacts are closed, latching means operatively engageable with said armature for mechanically retaining said contacts closed irrespective of subsequent opening of said control switch, means for biasing said latching means toward latching position, lever means operatively engageable with said latching means, actuating means driven by said motor and operatively engageable with said lever means for overcoming said biasing means to release said armature, said actuating means being arranged for intermittent operation and being effective only when said control switch is in open position, position limit switch means having contacts included in said motor circuit, means operated from said motor for opening the last said contacts and causing deenergization of said motor independently of said control switch, second lever means associated with said last contacts for operation thereby in said opening thereof, and means for connecting said second lever means to the first said lever means for overcoming said biasing means independently of said actuating means.

VICTOR WEBER.

REFERENCES CITED

The following references are of record in the file of this patent:

UNITED STATES PATENTS

| Number | Name | Date |
|---|---|---|
| 2,077,086 | Adair | Apr. 13, 1937 |
| 2,354,364 | Chapman | July 25, 1944 |